United States Patent
Adamson

[11] 3,824,533
[45] July 16, 1974

[54] DIGITAL COUNT RATE METER AND DEPTH DELAY SYSTEM FOR WELL LOGGING

[75] Inventor: Gerald P. Adamson, Houston, Tex.
[73] Assignee: Dresser Industries, Inc., Dallas, Tex.
[22] Filed: Sept. 18, 1972
[21] Appl. No.: 289,903

[52] U.S. Cl. ..... 340/18 DC, 235/151.3, 235/151.31, 340/18 P, 340/18 R
[51] Int. Cl. ............................................. G01v 1/40
[58] Field of Search ......... 340/18 DC, 18 P, 168 B; 235/151.3, 151.31, 151.32, 151.35; 328/39, 41; 307/220 R

[56] References Cited
UNITED STATES PATENTS

| | | | |
|---|---|---|---|
| 3,257,639 | 6/1966 | Kokesh | 340/18 P |
| 3,292,729 | 12/1966 | Blizaro | 340/18 DC |
| 3,434,105 | 3/1969 | Schwartz | 340/18 DC |
| 3,435,224 | 3/1969 | Zemanek, Jr. | 340/18 P |
| 3,488,661 | 1/1970 | Tanguy | 340/18 P |
| 3,559,163 | 1/1971 | Schwartz | 340/18 P |
| 3,720,110 | 3/1973 | McLaughlin et al. | 73/460 |

Primary Examiner—Maynard R. Wilbur
Assistant Examiner—H. A. Birmiel
Attorney, Agent, or Firm—Wm. E. Johnson, Jr.

[57] ABSTRACT

Electrical signals from a well logging instrument are coupled to the earth's surface where circuitry is provided for a series of common depth point correlations. In one embodiment, the digitized signals drive an eight-bit counter which is gated through eight respective buffer circuits to eight serial shift registers. The signals in the eight-bit counter section are clocked out to the buffer section once each second regardless of movement of the well logging instrument in the borehole. The signals are shifted from the shift register at the rate of four bits per foot of well logged into a digital-to-analog converter. The amount of delay within the circuit is a function of the number of bits in the shift register divided by the number of depth pulses per foot of well logged. In an alternative embodiment, the analog signal to be delayed is converted to a parallel ten-bit digital signal which is then converted to a series signal which is coupled into a serial shift register. The conversion process is a function of depth pulses relating to the number of feet logged in the well. The output of the serial shift register is connected to a series-to-parallel register which is coupled into a digital-to-analog converter. In still another embodiment, the serial shift register is used with means for selecting the length of the register to vary the amount of delay. In yet another embodiment, a plurality of signal channels is coupled through a multiplexer and an analog-to-digital converter to the shift register. As with the other embodiments, a depth pulse generator clocks the pulses through the system and a demultiplexer provides a plurality of analog channels at the output of the system.

2 Claims, 7 Drawing Figures

DIGITAL COUNT RATE METER AND DEPTH DELAY SYSTEM FOR WELL LOGGING

BACKGROUND OF THE INVENTION

This invention relates to depth delay circuitry for well logging systems in general, and in particular, to digital circuitry for providing common depth point correlation between various points of interest on well logging instruments.

It is well known in the logging of earth boreholes, commonly referred to as well logging, that depth delay devices and circuitry are desirable in order to display the various log signals at the same well depth on the log. In some such instruments, the data inception points may be as much as 50 feet or more apart due to physical restraints in the design of the instrument. In certain well logging instruments, it is necessary to process several signals in a computer before displaying the resultant data on the log. To do this requires correction of the depth of the data to a common depth point before processing the data.

Various means of overcoming this problem have been used in the prior art. For example, for depth corrections of only a few feet, it has been known that the data may be optically offset in the recording camera. Likewise, analog storage of the data using a capacitor storage device or devices is well known in the art. The use of such systems has produced various problems, for example, those associated with the bulkiness and expensive nature of the capacitors and especially those associated with the accuracy of the device. System electrical noise, electronic system amplitude and zero drifts are some of the more common problems encountered with capacitor storage devices.

It is therefore the primary object of the invention to eliminate the above-mentioned problems associated with the storage of analog data for depth delay purposes.

It is yet another object of the invention to provide new and improved circuitry for providing common depth point correlation between spaced apart points of interest on a well logging instrument;

It is still another object of the invention to provide new and improved circuitry for providing depth delays wherein the logical sequence of the circuitry is dependent upon the movement of the instrument within the well bore;

It is still another object of the invention to provide new and improved apparatus and circuitry for a plurality of channels of electrical information of interest;

It is still another object of the invention to provide new and improved circuitry for facilitating the selectability of the amount of delay within the circuit.

The objects of the invention are accomplished, generally, by circuitry wherein digital information is coupled into a serial shift register and clocked out of the shift register as a function of the movement of the well logging instrument in the borehole.

The novel features of the present invention are set forth in the appended claims. However, the invention, both as to its organization and manner of operation, together with other objects, advantages and features thereof, may best be understood by way of illustration and example when taken in conjunction with the accompanying drawing, in which:

Figure 1:
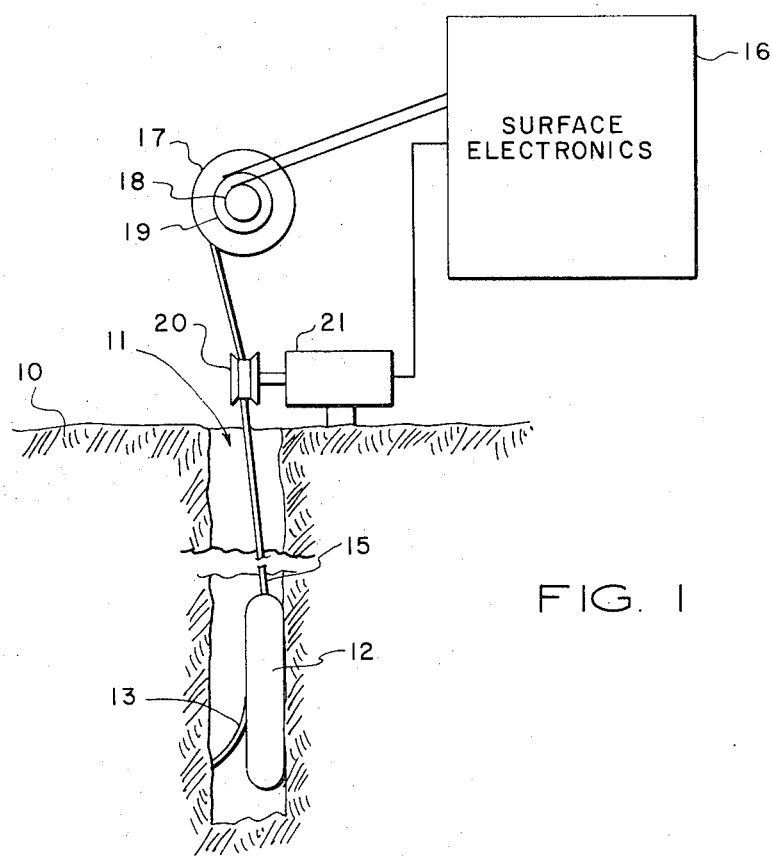
FIG. 1 is a side elevational view, partly in section, illustrating apparatus which may be used to carry out the invention, and the disposition of such apparatus relative to the strata to be examined.

Referring now to the drawing in more detail, especially to FIG. 1, there is illustrated schematically a well logging operation in which a portion of the earth's surface 10 is shown in vertical section. The well 11, which may be cased or uncased, penetrates the earth's surface 10. Disposed within the well is subsurface instrument 12 of the well logging system. As is well known in the art, the well logging instrument 12 may be any of various known types, for example, radioactivity, acoustic and electrical. However, with special relationship to the embodiments described hereinafter with regard to FIG.'s 2 and 3, it is preferred that the well logging instrument 12 comprise a gamma ray source and a pair of radioactivity detectors (not shown). The instrument 12 is maintained against the side of the borehole wall by the conventional caliper instrument 13. Cable 15 suspends the instrument 12 in the well and contains the required conductors for electrically connecting the instrument 12 with the surface apparatus and electronics 16. The cable 15 is wound on, or unwound from, drum 17 in raising or lowering the instrument 12 to transverse the well 11 during the logging thereof. Electrical signals from the instrument 12 are transported through the cable 15 to slip rings 18 and 19 on the drum 17 and from there to the surface electronics 16. The cable 15 passes over a sheave 20 which, through the use of a transmission 21, drives a recorder in the surface electronics 16 in synchronism with the movement of the cable 15. The transmission assembly 21 also includes an encoder mechanism described in U.S. Pat. No. 3,426,303, assigned to the assignee of the present invention, wherein electrical depth pulses are generated in response to the movement of the cable 15 and the well logging instrument 12 while traversing the well 11.

Figure 2:
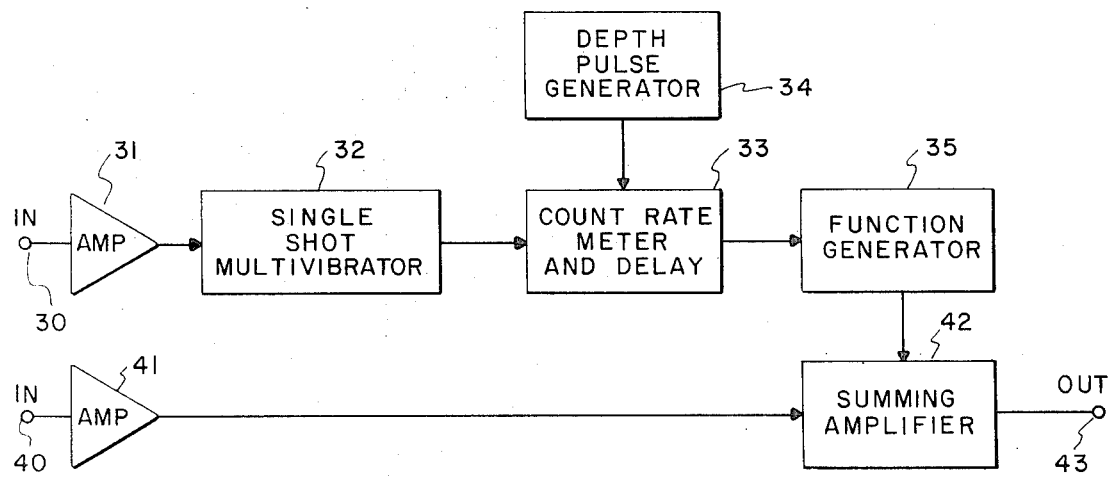
FIG. 2 is a block diagram of a portion of the surface electronics according to the invention.

Referring now to FIG. 2, there is illustrated in block diagram a portion of the surface electronics section 16 illustrated in FIG. 1. The input terminals 30 and 40 are connected from the slip rings 18 and 19 and have imposed thereon electrical signals from the well logging instrument 12. The input terminal 30 is connected through an amplifier 31 to a single shot multivibrator whose output is connected to the input of the count rate meter and delay circuit 33 described in more detail in FIG. 3. A depth pulse generator 34 (embodied within the apparatus 21 in FIG. 1) has its output connected into the count rate meter and delay circuitry 33. The output of the circuit 33 is connected to the function generator 35.

The input terminal 40 is connected through an amplifier 41 to a summing amplifier 42 having another input from the output of the function generator 35. The output of the summing amplifier 42 is connected to an output terminal 43. It should be appreciated that the circuitry of FIG. 2 is especially useful in conducting a radioactivity well logging surface as described in U.S. Pat. No. 3,538,329,, assigned to the assignee of the present invention.

In the operation of the circuit of FIG. 2, it should be appreciated that the individual pulses representative of detected radiation are coupled into the input terminal 30 and that the caliper signals from the caliper 13 are connected into the input terminal 40. Since the caliper is usually at a different depth on the instrument 12 than the radioactivity detector, the count rate meter and delay circuit 33 provides depth compensation in a manner described hereinafter with respect to FIG. 3. Suffice it to say at this point that if the caliper is physically removed from the radioactivity detector by an amount equal to 5.3 feet, a delay of 5.3 feet in the delay circuit 33 provides the necessary depth compensation whereby the caliper signal is used to alter the linearized neutron signal to compensate for the borehole diameter effect.

Figure 3:
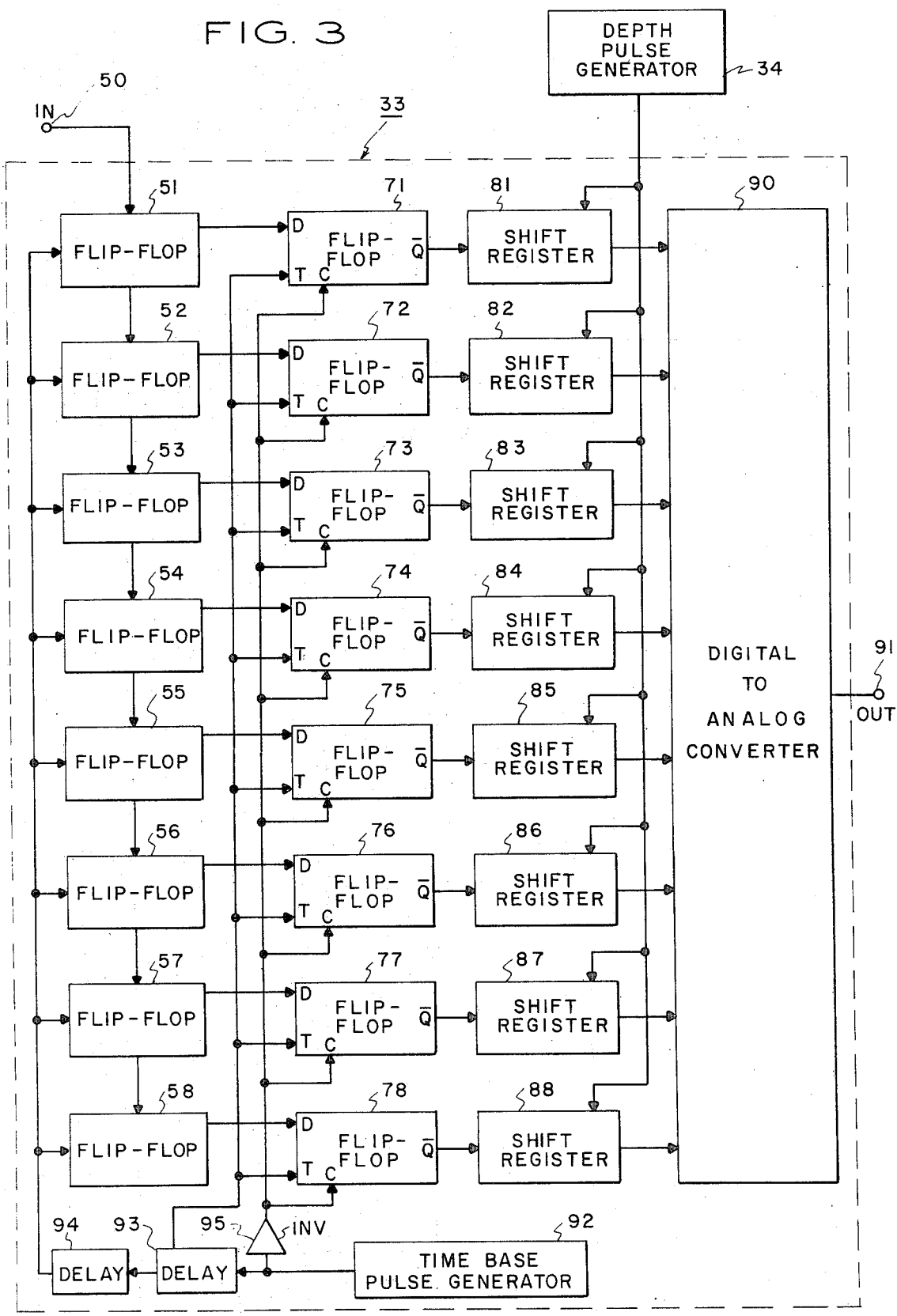
FIG. 3 is a block diagram showing in greater detail the count rate meter and delay circuitry of FIG. 2.

Referring now to FIG. 3, there is illustrated in greater detail the count rate meter and delay circuit 33 illustrated in block diagram in FIG. 2. The input terminal 50, being connected to the output of the single shot multivibrator 32, is connected to a "counter" section having eight flip-flop circuits 51–58 connected together in a manner as to form an eight-bit counter. The outputs of the flip-flop circuits 51–58 are connected, respectively, to the "D" inputs of the D-type flip-flops 71–78. The $\overline{Q}$ outputs of the flip-flops 71–78 in the "buffer" section are connected, respectively, to eight serial shift register circuits 81–88. The outputs of the shift register circuits 81–88 are connected, respectively, to the inputs of a digital-to-analog converter circuit 90 having an output terminal 91.

A time base pulse generator 92, having a pulse repetition rate of one pulse per second, has its output tied through an inverter 95 to the "clear" input (bearing the legend "C") of the buffer flip-flop circuits 71–78. The output of the pulse generator 92 is also connected through a first delay circuit 93 to each of the "toggle" or clock inputs (bearing the legend "T") of flip-flops 71–78. The output of the delay circuit 93 is also connected through a second delay circuit 94 to the reset inputs of the counter flip-flop circuits 51–58. Each of the delay circuits 93 and 94 are set to have a one-half microsecond delay. The output of the depth pulse generator 34 is connected to each of the "shift" inputs of the shift registers 81–88.

The counter circuitry, illustrated as having flip-flops 51–58, is preferably formed from two four-bit flip-flops available from Texas Instruments, Inc. in Dallas, Texas, under their part No. SN7493N, being serially connected to form a single eight-bit counter. This forms an eight-bit counter whose bit outputs are available as a binary word indicating how many pulses have been accumulated by the counter from the time it was last reset to zero. The buffer flip-flops 71–78 are formed from Texas Instruments, Inc.'s part No. SN7475N which comprise four-bit bistable latches. This is the equivalent of four separate D-type flip-flops. Each output of the eight-bit counter is connected to a respective input of the flip-flops in the buffer circuit 71–78. Although there are eight shift register circuits 81–88 illustrated, if desired, one can practice the invention by using only six shift register circuit attached to the six most significant bit outputs (flip-flop circuits 73–78), and in so doing, use three SL-6-2064 dual 64-bit static shift registers available from General Instruments, Inc., located in Hicksville, L.I., New, York, The digital-to-analog converter circuit, if using only the six most significant bits, can be a part number DAC-01 available from Precision Monolithics Incorporated in Santa Clara, California. If all eight bits are used, one can use four of the SL-6-2064 dual shift registers and add external bits to the digital-to-analog converter for greater resolution.

In the operation of the circuit of FIG. 3, the input pulses are applied to the input terminal 50 which is the beginning point of the counter comprised of flip-flop circuits 51–58. Immediately prior to the application of the pulses to the input terminal 50, the pulse generator 92 generates a short duration pulse, for example, of one-half microsecond duration, to clear the buffer circuits 71–78. One-half microsecond later, the signal is applied from the output of the delay circuit 93 to the toggle or "T" inputs of the buffer flip-flop circuits 71–78. This causes the digital information then present on the "D" inputs of the flip-flops 71–78 coming from the flip-flops 51–58 to be clocked out of the $\overline{Q}$ outputs of the flip-flops 71–78. It should be appreciated that the Q outputs of the flip-flops 71–78 can be used but the $\overline{Q}$ is desirable in view of the particular digital-to-analog converter used in the preferred embodiment.

As is well known in the art, a "D" type flip-flop has one "D" input, one clock or toggle input (T), Q and $\overline{Q}$ outputs and preset (P) and clear (C) inputs. With such a circuit, a logical 0 on the C input forces the Q output to go to 0. By placing a logical 1 on each of the P and C inputs and having a logical 0 on the P input, the placing of a logical 1 on the D input may be transferred to the Q output by toggling the T input high. Likewise, a logical 0 on the D input is transferred to the Q output by toggling the T input from a low to a high. Thus, by maintaining the P input (not shown) always at a logical high, the flip-flop circuit 71–78 are set to have a 0 on the Q output and a 1 on the Q output whenever the inverted pulse from the time base generator is applied to the C input of each flip-flop. Thereafter, the delayed pulse from the pulse generator 92 toggles the flip-flops 71–78 to clock through whatever data, being either a logical 1 or a logical 0, exists on the D input of each flip-flop 71–78. As a consequence, the information which is stored in the buffer flip-flops 71–78 is available for entry into the shift registers 81–88 upon the application of a pulse thereto from the depth pulse generator 34. Since the time base pulse generator generates a pulse each second, this results in the buffer flip-flops 711–78 retaining a binary word for 1 second and then being updated with new data. During this interval, this binary word may or may not be entered into the shift registers 81–88 depending upon the occurrence of a depth pulse.

In using the dual 64-bit static shift registers, there must be 64 depth pulses to move any single binary word from the input to the output of the shift register. As indicated previously, the depth encoder described in U.S. Pat. No. 3,426,303 can be used or, as an alternative depth pulse generator, the depth pulses can originate from a switch synchronized with the conventional logging camera in such a manner as to produce four pulses for every foot of log. If these pulses drive the shift registers directly, the amount of delay is equal to 64/4 which equals 16 feet of delay. In this particular embodiment, since the radioactivity logging instrument has a separation of 5.3 feet between the caliper and the radioactivity detector, the depth pulses are sent to a clock card (not shown) where a three-quick-pulses-out-for-one-in circuit exists. These pulses then are the ones that actually drive the shift register to produce 5.3 feet of delay.

The depth pulses are asynchronous with the pulses from the generator 92 resetting the counter and buffer which is of no consequence since the movement of instrument 12 is associated only with the binary number in the buffer and the first bit in the shift register. If the well logging instrument stops in the well, the buffer number remains the same within statistically varying limits and the shift register is not moving data.

The binary word presented from the output of the shift registers to the digital-to-analog converter 90 causes an analog voltage proportional to the binary word to appear at the output 91 of the digital-to-analog converter. This analog voltage is then the neutron signal delayed by 5.3 feet and which can be corrected by the caliper signal in the analog computer illustrated in FIG. 2 and shown in greater detail in the aforementioned U.S. Pat. No. 3,538,329.

Figure 4:
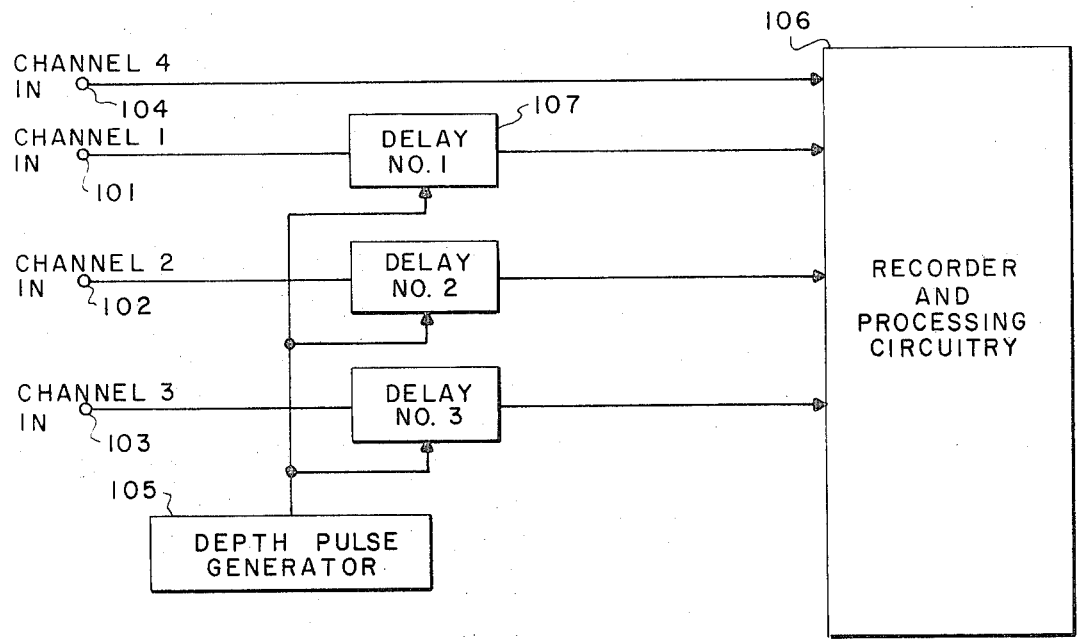
FIG. 4 is a block diagram of portions of the surface electronics according to the invention.

Referring now to FIG. 4, there is illustrated a four channel portion of the surface electronics according to the invention wherein channels 1, 2 and 3, being respectively associated with input terminals 101, 102 and 103, each have their own delay circuit. Each of the delay circuits No. 1, No. 2 and No. 3 are driven by a common depth pulse generator 105. The fourth channel, being associated with the input terminal 104, has no delay line therein. The outputs of the delay circuits No. 1, No. 2 and No. 3, as well as the input terminal 104, are each connected into the recorder and processing circuitry 106 which can be of any conventional type.

In the operation of the circuitry of FIG. 4, it should be appreciated that it finds special utility wherein the signal information appearing on input terminals 101, 102 and 103 requires depth synchronization with the electrical signals appearing at input terminal 104. For example, if the four channels are representative of events of interest occurring at spaced 2 foot intervals within the well logging instrument, the delay circuit No. 1 can be set for a 2 foot delay; the delay circuit No. 2 can be set for a 4 foot delay; and the delay circuit No. 3 can be set for a 6 foot delay. This results in the four inputs to the recorder and processing circuitry 106 being in complete depth synchronization.

Figure 5:
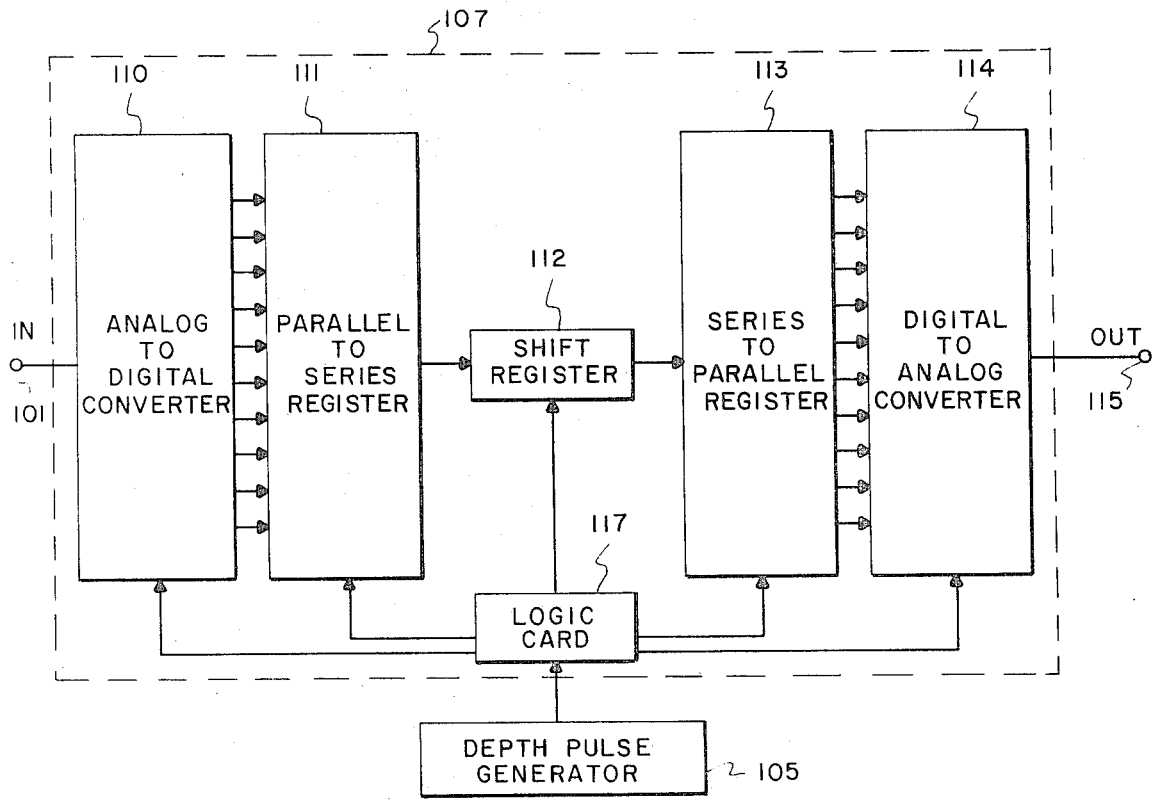
FIG. 5 is a block diagram of an alternative embodiment of the delay circuit according to the invention.

Referring now to FIG. 5, the delay circuit 107 is shown in greater detail than is described in the block diagram of FIG. 4. It should be appreciated that the delay circuits No. 1, No. 2 and No. 3 of FIG. 4 are identical and that only one is shown in detail in FIG. 5. Even though being identical, however, it should be appreciated that different delays may exist in each of the delay circuits as is explained in more detail with respect to FIG. 6.

Referring further to FIG. 5, the input terminal 101, being assoced with channel 1, is connected to the input of an analog-to-digital converter 110. The 10 bit output of the analog-to-digital converter 110 is connected to the inputs of a parallel-to-series register 111 whose output is connected into a serial shift register 112. The output of the shift register 112 is connected to a series-to-parallel register 113 whose 10 bit output is connected to the input of a digital-to-analog converter 114. The output of the digital-to-analog converter 114 is connected to an output terminal 115 which is connected to the recorder and processing circuitry 106 of FIG. 4. The depth pulse generator 105 has its output connected to a logic card 117 which has electrical connections to each of the analog-to-digital converter 110, parallel-to-series register 111, shift register 112, series-to-parallel register 113 and the digital-to-analog converter 114.

In the operation of the circuit of FIG. 5, it should be appreciated that the depth pulse generator 105 can be one of the aforementioned depth encoders or, if desired, can utilize the depth code apparatus and circuitry described in U.S. Pat. application Ser. No. 282,884, filed Aug. 21, 1972, of Gerald P. Adamson, entitled "Circuit for Suppression of Spurious Pulses Resulting from Relay Operation" and assigned to the assignee of the present invention. The analog-to-digital converter circuit converts the high level analog signal appearing at input terminal 101 from analog to 10 bit digital information 4 times per foot of depth logged. Because of the register 111, the information, being in serial form, is then stored in the shift register 112. When using a dual 200 bit register, the shift register 112 has a capacity of 400 bits of data. Using a sample rate of four pulses per foot of depth and 10 bits of data per sample (40 bits per foot), the 400 bit shift register 112 has a storage capacity of 10 feet of depth (400/40). At the end of each data conversion, the analog-to-digital converter 110 furnishes an "end of conversion" output signal which is used to dump the data in the series-to-parallel register into the digital-to-analog converter 114 by means of a bistable latch (not shown). Thus, the output appearing at terminal 115 is a DC signal exactly like the analog signal input appearing at terminal 101 except for being delayed in depth. By connecting shift registers in series, selectable depth delays are possible, for example, from 1 to 50 feet of depth. A maximum of 50 foot depth delay is adequate for most practical well logging systems. However, additional shift registers can be used if more delay is required.

Figure 6:
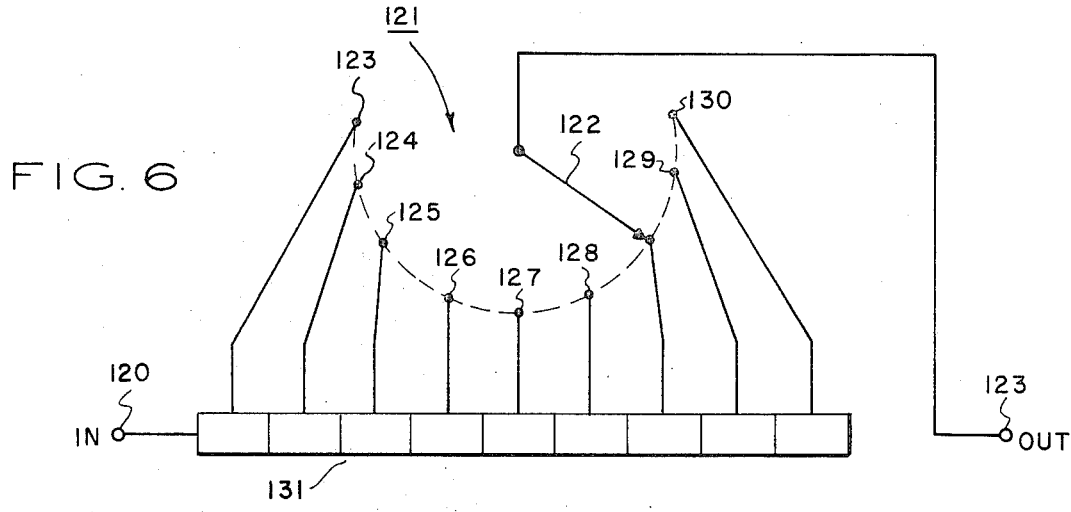
FIG. 6 is a schematic illustration of means for providing a selectable delay according to the invention.

Referring now to FIG. 6, apparatus and circuitry is illustrated for providing a selectable delay. The input terminal 120 is connected to a long, for example 2,360 bit, random access static shift register. The switch 121 has its wiper arm 122 connected to the output terminal 123. The nine switch contacts 123–130 are connected to various gates within the shift register 131 to thus determine the effective bit length of the shift register 131. If desired, instead of a mechanical switching arrangement as illustrated, those in the art will recognize that electrical coding, for example, BCD, can be used to inhibit the gates within the shift register 131 and also provide the desirable effective length of the shift register 131 to thus provide the desired depth delay. The circuitry of FIG. 6 can be used between the output of the parallel-to-series register 111 and the input of the series-to-parallel register 113 illustrated in FIG. 5 in place of shift register 112.

Figure 7:
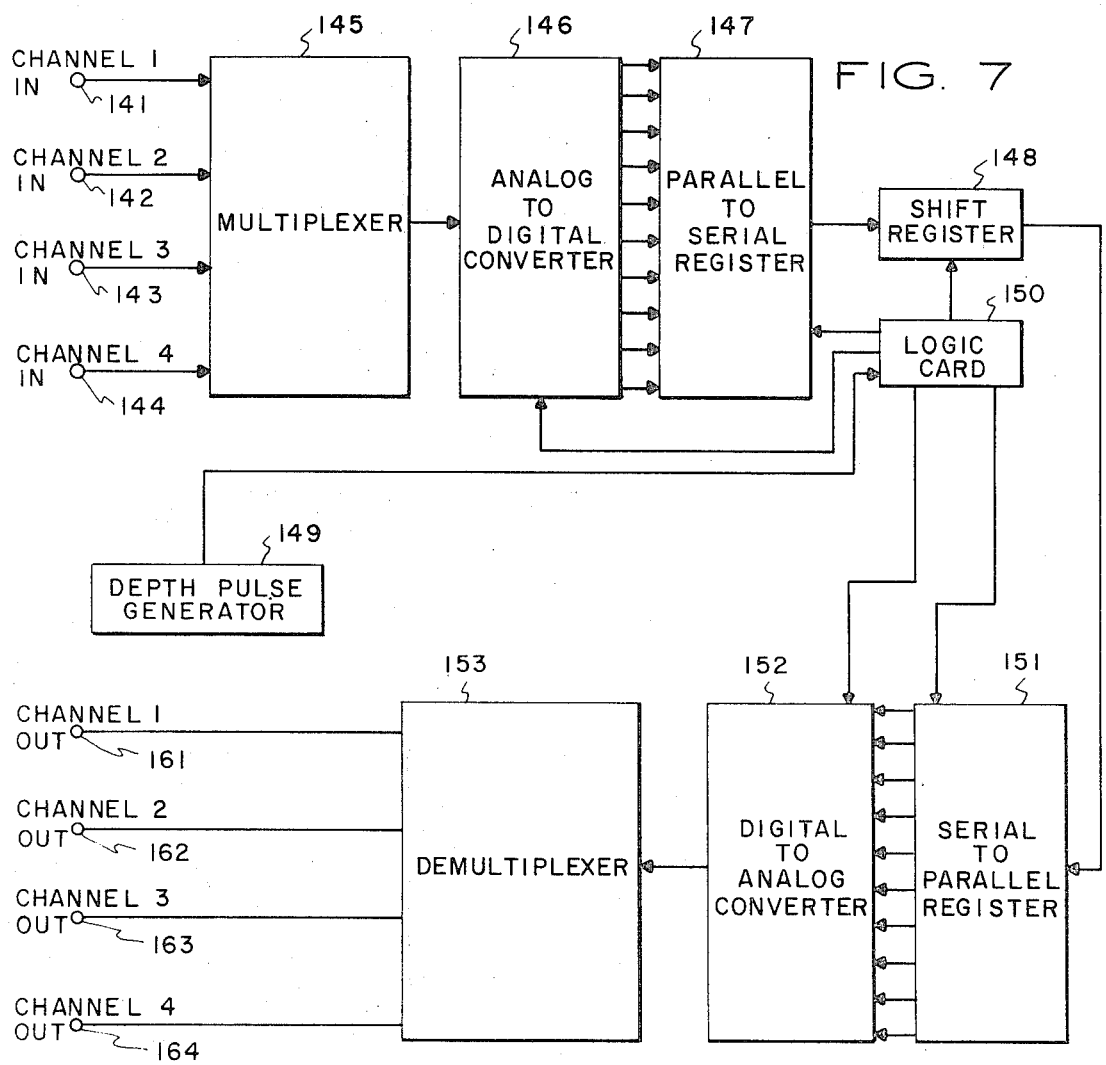
FIG. 7 is a block diagram of an alternative embodiment of the delay circuitry according to the invention.

Referring now to FIG. 7, the input terminals 141, 142, 143 and 144 are connected to the inputs of a conventional multiplexer 145, for example, either mechanical or electrical, the output of which is connected into the input of the analog-to-digital converter 146. The 10 bit output of the analog-to-digital converter 146 is connected into a parallel-to-serial register 147 whose output is connected into a serial shift register 148. A depth pulse generator 149 is connected through a logic card 150 to control the readout and shifting of the data within the circuitry of FIG. 7. The output of the shift register 148 is connected into the input of the serial-to-parallel register 151 whose ten-bit outputs are connected into the input of the digital-to-analog converter 152 whose output is connected into the conventional demultiplexer circuit 153 which has four output terminals 161, 162, 163 and 164.

In the operation of FIG. 7, it should be appreciated that by using the multiplexer circuitry 145 and demultiplexer circuit 153, the circuitry of FIG. 5 is modified to the extent that a plurality of signal input channels, for example, channels 1–4, can be delayed in depth to the extent as dictated by the shift register 148 to thereby delay the electrical signals appearing at the input terminals by an amount as desired.

It should thus be appreciated that there has been described herein a new and improved system for delaying the electrical signals in one or more electrical circuits to provide depth compensation resulting from the logging of earth boreholes. Although the preferred embodiments of the invention have been illustrated and described in detail, modifications of the embodiments illustrated herein will occur to those skilled in the art. For example, the outputs of the one or more shift registers can be used with digital recording and/or processing circuitry in lieu of converting the digital outputs to analog information. Furthermore, where the information is in digital form already, there is no need for converting the original analog signals to digital signals. In a similar manner, the depth code pulses need not occur at four pulses per foot but can be any number desired.

The embodiments of the invention in which an exclusive property or privilege is claimed are defined as follows:

1. A system for providing common depth point correlation between two points of interest on a well logging instrument wherein said two points are separated by a given distance along the length of said instrument, comprising:

means for generating an analog signal functionally related to a characteristic of the earth formations at the same depth in an earth borehole as one of said two points on said instrument;

means for converting said analog signal to digital signals having a parallel format;

a parallel to series register adapted to convert said digital signals in parallel format into digital signals in series format;

a serial shift register adapted to receive said digital signals in series format;

means for generating electrical depth pulses indicative of the movement of said well logging instrument through the earth borehole;

means responsive to said depth pulses for removing said digital signals from said shift register in a series format;

a series to parallel register adapted to convert said digital signals in series format into digital signals in parallel format; and means for converting the digital signals in parallel format at the output of said series to parallel register into an analog signal.

2. A system for providing common depth point correlation among electrical signals originating from a plurality of locations spaced along the length of a well logging instrument, comprising:

means for generating a first analog signal functionally related to a characteristic of the earth formations at the same depth in an earth borehole as that of one of said plurality of locations;

means for generating a second analog signal functionally related to a characteristic of the earth formations at the same depth in an earth borehole as that of a second of said plurality of locations;

a multiplexer adapted to receive and multiplex said analog signals;

means for converting said multiplexed analog signals to digital signals having a serial format;

a serial shift register adapted to receive said digital signals;

means for generating electrical depth pulses indicative of the movement of said well logging instrument through the earth borehole;

means responsive to said depth pulses for removing said digital signals from said shift register;

means for converting said digital signals to analog signals; and a demultiplexer adapted to demultiplex said analog signals.

* * * * *